(12) United States Patent
Dow

(10) Patent No.: US 9,386,749 B1
(45) Date of Patent: Jul. 12, 2016

(54) PRODUCT TO WINDROWS PICKUP HEAD

(71) Applicant: Paul W. Dow, Byron, NY (US)

(72) Inventor: Paul W. Dow, Byron, NY (US)

(73) Assignee: Black Creek, LLC, Byron, NY (US)

( * ) Notice: Subject to any disclaimer, the term of this patent is extended or adjusted under 35 U.S.C. 154(b) by 0 days.

(21) Appl. No.: 14/674,061

(22) Filed: Mar. 31, 2015

(51) Int. Cl.
*A01D 76/00* (2006.01)
*A01D 78/00* (2006.01)
*A01D 80/00* (2006.01)
*A01D 84/00* (2006.01)
*A01D 89/00* (2006.01)

(52) U.S. Cl.
CPC ............ *A01D 89/002* (2013.01); *A01D 89/004* (2013.01)

(58) Field of Classification Search
CPC ..... A01D 89/002; A01D 80/02; A01D 29/02; A01D 89/004; A01D 41/10; A01D 89/00; A01D 89/008
USPC .......... 56/379, 364, 16.4 R, 327.1, 104, 16.1, 56/17.2, 208
See application file for complete search history.

(56) References Cited

U.S. PATENT DOCUMENTS

| | | | | |
|---|---|---|---|---|
| 1,877,519 A * | 9/1932 | MacGregor | ............ | A01D 41/10 56/364 |
| 2,627,159 A * | 2/1953 | Russell | .................. | A01D 89/00 198/518 |
| 2,644,292 A * | 7/1953 | Oberholtz | ............ | A01D 89/002 56/14.5 |
| 2,953,830 A * | 9/1960 | MacRae | .................. | F16B 2/241 24/458 |
| 3,099,347 A * | 7/1963 | Dahlquist | .............. | A01D 80/02 198/692 |
| 3,323,196 A * | 6/1967 | Renn | ..................... | A01D 89/002 15/198 |
| 3,828,536 A * | 8/1974 | Fowler | ................... | A01D 45/10 209/153 |
| 3,962,849 A | 6/1976 | Stoessel | | |
| 4,136,507 A * | 1/1979 | Hobbs | ..................... | A01D 29/00 460/128 |
| 4,162,811 A * | 7/1979 | Hobbs | .................... | B65G 53/14 406/144 |
| 4,189,907 A * | 2/1980 | Erdman | .................. | A01D 80/02 172/713 |
| 4,464,890 A * | 8/1984 | Scholtissek | ............ | A01D 41/10 56/17.2 |
| 4,539,801 A * | 9/1985 | Field | ..................... | A01D 61/008 198/613 |
| 4,696,151 A * | 9/1987 | Hobbs | .................... | A01F 12/442 56/14.6 |
| 4,947,626 A * | 8/1990 | Maier | ..................... | A01D 80/02 56/364 |

(Continued)

*Primary Examiner* — Árpád Fábián-Kovács
(74) *Attorney, Agent, or Firm* — Tracy Jong Law Firm; Tracy P. Jong; Cheng Ning Jong

(57) ABSTRACT

A pickup head having a materials lifting end and a materials lofting end, the pickup head including a lifting roller, a transfer roller and a lofting roller. The lifting roller is adapted to rotate about an axis of rotation and disposed on the materials lifting end and includes picking fingers protruding from the lifting roller. The transfer roller is adapted to rotate about an axis of rotation and includes picking fingers protruding from the outer surface of the tube of the transfer roller. The transfer roller is disposed at an elevation higher than the lifting roller between the materials lifting end and the materials lofting end. The lofting roller is adapted to rotate about an axis of rotation and includes lofting effectors protruding from the outer surface of lofting roller. The lofting roller is disposed at an elevation higher than the transfer roller at the materials lofting end.

5 Claims, 14 Drawing Sheets

(56) References Cited

U.S. PATENT DOCUMENTS

| | | | |
|---|---|---|---|
| 5,042,243 A * | 8/1991 | Doering | A01D 80/02 460/122 |
| 5,076,046 A * | 12/1991 | Schilling | A01D 45/008 171/128 |
| 5,138,826 A * | 8/1992 | Hobbs | A01F 11/00 460/126 |
| 5,205,114 A * | 4/1993 | Hobbs | A01F 11/00 460/126 |
| 5,309,703 A * | 5/1994 | Brinton | C05F 17/0241 241/101.75 |
| 5,980,382 A * | 11/1999 | Brantley | A01F 11/00 171/26 |
| 6,244,027 B1 | 6/2001 | McClure et al. | |
| 6,877,304 B1 * | 4/2005 | Smith | A01F 15/106 56/341 |
| 6,996,965 B2 * | 2/2006 | Ligouy | A01D 43/10 56/16.4 R |
| 7,127,876 B2 * | 10/2006 | Ligouy | A01D 43/10 56/16.4 R |
| 7,370,462 B2 * | 5/2008 | Kraus | A01D 89/006 100/74 |
| 7,726,111 B2 * | 6/2010 | Grywacheski | A01D 57/20 56/364 |
| 8,166,739 B2 | 5/2012 | Dow et al. | |
| 8,209,947 B2 * | 7/2012 | McClure | A01D 89/002 56/364 |
| 8,312,700 B2 | 11/2012 | Leiston | |
| 8,833,048 B2 * | 9/2014 | Honey | A01D 57/12 56/220 |
| 2003/0213223 A1 * | 11/2003 | Derscheid | A01D 75/185 56/341 |
| 2006/0283163 A1 * | 12/2006 | Kraus | A01F 15/0816 56/16.8 |

\* cited by examiner

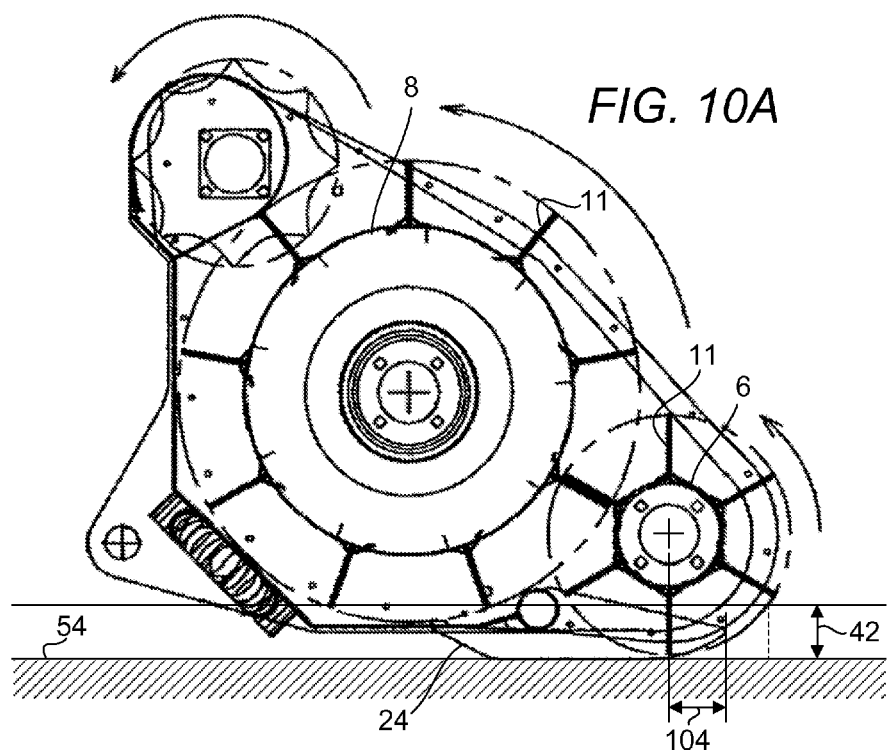

PRODUCT TO WINDROWS PICKUP HEAD

BACKGROUND OF THE INVENTION

1. The Field of the Invention

The present invention is directed generally to a pickup head. More specifically, the present invention is directed to a pickup head for converting a product to windrows.

2. Background Art

Harvesters, balers and mergers such as those that may be used for picking up and/or harvesting hay, beans and other agricultural products are well known and provide for mechanized pick up of agricultural products from the field. The crop is typically either picked up from a windrow, which has been laid by other machinery, or directly cut, from the ground. In other instances, crops are first mowed with mowers where the product is left wide spread on the ground without any effort in redirecting the product into windrows, etc. The product may subsequently be picked up by mergers to form windrows. Such harvesting devices generally include a tine or tooth reel having a plurality of tines or teeth or sets of tines or teeth spaced along a transverse axis that engage the agricultural product near the ground and propel it up over the reel and rearward. The crop is delivered from the head to a conveying system and to further processing machinery where some crops, such as hay are baled or chopped further.

Hay mergers have a fundamentally different head that includes conveyors associated with the reels that transport hay to one end or the other for creating windrows.

Devices for merging windrows are well known and are used to gather material, such as cut hay that might be windrowed, and merge it into one or more windrows for harvesting or baling. Such windrow mergers typically included a single pickup head to move the material to a single row at one side of the merger. The merging and often other ensuing operations must often be performed during a small timeframe when conditions are favorable, e.g., when the ground is dry and firm and when it is not raining and when the product is at its suitable moisture level, so that the need exists for a merger with greater merging capacity so as not to slow the harvest process and that windrow merging activity can be completed within this small timeframe. A limiting factor for getting the merging and other duties completed within the small timeframe is the availability of the devices. The availability of reliable devices for merging is important in that windrow merging is typically performed just before windrows are baled, chopped and hauled away subsequently to their respective destinations. The machines, including mergers, must be available to complete windrow merging or other subsequent operations will be halted.

A conventional merger employs a pickup head having a single reel with flexible steel teeth controlled by a cam that establishes a path where the tooth picks up the product and throws it rearward, retracts to clear other structures and then repeats the cycle. A conventional pickup head requires a reel encompassing a rather large overall diametric space to get the crop to a desired height to be deposited onto a conveyor belt disposed at a height, into a windrow, cutting chamber, or into a baling mechanism. In another conventional pickup head, a wide belt with plastic or steel teeth affixed to the wide belt is used to pick up the product and convey it to a greater height. The use of a wide belt means that the amount of moving parts, such as the flexible belt itself and other supporting parts, e.g., drive and idler wheels or rollers and the maintenance required to keep the system running smoothly, are tremendous. Further, any undesired materials, e.g., stones or dirt, unwittingly picked up and thrown on the belt are mixed in with formed windrows. Yet further, such wide belt devices have a taller profile which makes it more challenging to group them together for a wider pickup such as the pickup heads disclosed in U.S. Pat. No. 8,166,739 to Dow et al.

U.S. Pat. No. 8,312,700 to Leiston (hereinafter Leiston) discloses a tine assembly used with an agricultural machine such as a harvester or hay merger. The tine assemblies mount on a reel that rotates about an axis extending transverse to the direction of travel. The tine assembly includes a first tine and a second tine, each having a main extended portion and a lateral portion extending transverse to the main portion at a mounting end of the tines. The lateral portions mount into tabs or opposite ends of a sleeve. The sleeve or tabs and mounting end of the tines are enclosed by a molded mounting portion that also includes a reinforcing arcing element configured for mounting to the reel bar. The arcing element includes orifices that allow for easily bolting and unbolting the tine assemblies for easy attachment and removal. Detachment of a mounting portion from an arcing member is possible, bringing with it the tines attached to it.

When this event occurs, the detached portions can be inadvertently mixed in with windrows and eventually make their way to animal feed. If such portions are consumed by animals, e.g., cattle, this can cause animal loss. Conventional tines may come in pairs where the tines are spaced apart at a gap transverse to the travel direction of the tines, making the tines suitable for picking up, not only products, but also undesirable materials, e.g., stones in unison. Although Leiston includes provisions to avoid stone or other obstacle pickup, if such stone is aligned favorably with a pair of tines, the stone can still be picked up inadvertently. It is conventional wisdom to equip an agricultural product with pickup pitchfork-style tines where the tines are aligned in close proximity to perform in unison where the tines are disposed in a direction transverse to the travel direction of the tines.

U.S. Pat. No. 6,244,027 to McClure et al. (hereinafter McClure) discloses a ground gauging roller assembly supports an attachment to protect a reel during operation over uneven terrain. The ground gauging roller is disposed significantly downstream from the pick-up reel in the direction of travel, making the reel still exposed to engagement with obstacles, stones, rocks, etc., or any protrusions from the ground. McClure is suitable only for mildly uneven grounds. In contract harvesting especially however, a harvesting crew must work on lands unfamiliar to the crew and typically work large swaths of land on daily basis. The lack of specific knowledge for hazardous areas (strewn with stones, etc.) to avoid can cause significant downtime due to any damage caused to the pickup head. Still, there are instances where ground gauging wheels are mounted in yet another undesirable location. U.S. Pat. No. 3,962,849 to Stoessel discloses a gauging means that senses rises and falls in the terrain in front of the header to swing the latter up and down to accommodate such unevenness in the terrain. Again, the gauging means are disposed ahead of a pickup head which can still contact a protrusion in the ground. Further, there are only two ground engaging wheels, one on each side of the pickup head, making ground gauging absent along the width of the pickup head.

Thus, there is a need for a pickup head capable of lifting product at a more aggressive angle to form improved windrows, a pickup head capable of moving product without clogging problems and causing maintenance issues associated with cam-driven rollers and a pickup head which does not inadvertently pick up and mix dirt, stone and other unwanted materials in the windrows. There is further a need to prevent or reduce detachment of tines or other parts from any equipment used in product gathering or processing.

SUMMARY OF THE INVENTION

In accordance with the present invention, there is provided a pickup head 2 having a width, a materials lifting end and a materials lofting end, the pickup head 2 including a lifting roller 6, a transfer roller 8 and a lofting roller 10. The lifting roller 6 is adapted to rotate about a first axis of rotation and disposed on the materials lifting end, the lifting roller 6 includes a cylindrical tube having two opposingly disposed ends, an outer surface, a first diameter and a plurality of picking fingers 11 protruding from the outer surface of the cylindrical tube of the lifting roller 6. In one embodiment, the distance 94 between two consecutive teeth of the lifting roller 6 in a direction parallel to the first axis of rotation is no less than about 6 inches. In one embodiment, the lifting roller 6 is a cylindrical tube. The transfer roller 8 is adapted to rotate about a second axis of rotation, the transfer roller 8 including a tube having two opposingly disposed ends, an outer surface, a second diameter and a plurality of picking fingers 11 protruding from the outer surface of the tube of the transfer roller 8, wherein the transfer roller 8 is disposed at an elevation higher than the lifting roller 6 between the materials lifting end and the materials lofting end. In one embodiment, the transfer roller 8 is a cylindrical tube. The lofting roller 10 is adapted to rotate about a third axis of rotation, the lofting roller 10 including a tube 58 having two opposingly disposed ends, an outer surface and a plurality of lofting effectors 56 protruding from the outer surface of the tube of the lofting roller 10. The lofting roller 10 is disposed at an elevation higher than the transfer roller 8 at the materials lofting end. In a preferred embodiment, the first, second and third axes of rotation are disposed in a parallel configuration to one another.

In one embodiment, the lofting roller 10 includes a tube 58 having a cross-sectional profile of a square and a plurality of lofting effectors or discs 56, each disc 56 having a cavity having a cross-sectional profile substantially similar to the cross-sectional profile of the square tube 58 and is adapted to slide over and be secured to the square tube.

The lifting roller 6 is configured to lift materials disposed upstream of the materials lifting end of the pickup head 2 while the pickup head 2 advances in the direction from the materials lifting end to the materials lofting end, the transfer roller 8 is configured to receive materials lifted with the lifting roller 6 and conveying the materials to the lofting roller 10, which subsequently lofting the materials downstream from the materials lofting end of the pickup head 2.

The present pickup head further includes a plurality of strippers 26 disposed on the lofting roller 10, wherein the strippers 26 are configured to separate the materials from the lofting roller 10.

The present pickup head further includes a float control mechanism adapted to adjust the pressure exerted by at least a portion of the weight of the pickup head 2 on the ground. In one embodiment, the float control mechanism is an air bag 22 having a first end and a second end, wherein the first end is adapted to urge against the pickup head 2 and the second end is adapted to urge against a portion of the frame to which the pickup head is mounted, whereby if the air bag is increasingly inflated, the pressure exerted by at least a portion of the weight of the pickup head on the ground via skid shoes 24, is reduced and if the air bag is increasingly deflated, the pressure exerted by at least a portion of the weight of the pickup head on the ground via skid shoes 24, is increased.

In one embodiment, the present pickup head further includes a ground gauging device 24. In one embodiment, the ground gauging device 24 includes a plurality of skid shoes 24 distributed along the width of the pickup head 2, each of the plurality of skid shoes 24 is connected to a mounting bar 78 of the pickup head 2 and rotatable about rocking axis 30. In one embodiment, rotation of a skid shoe 24 about mounting bar 78 is prevented and therefore in such an embodiment, the skid shoe 24 is fixedly attached to the mounting bar 78.

In one embodiment, the ground gauging device 24 includes a plurality of skid shoes 24 distributed along the width of the pickup head 2 and each of the plurality of skid shoes 24 is disposed such that the horizontal distance 104 between the rotational axis of the lifting roller 6 (or first axis of rotation) and the front tip of the skid shoe 24 is about 2 inches.

In one embodiment, at least one of the plurality of teeth 11 of the lifting roller 6 and the transfer roller 8 includes a base 14, a tine 12 having a top end and a bottom end, the bottom end of the tine 12 is attached to the base 14, a retainer 16 having a cavity and a slot 18 disposed on the retainer 16, the tine 12 is configured to be inserted through the slot 18 with the top end of the pin first such that the base 14 is configured to be seated within the cavity and the retainer 16 configured for attachment to the outer surface of the lifting roller 6 or the transfer roller 8.

In one embodiment, the ratio of the lifting tip speed to the transferring tip speed is about 0.79.

In one embodiment, the ratio of the transferring tip speed to the lofting tip speed is about 0.52.

An object of the present invention is to provide a pickup head for a hay harvesting machine that is more reliable, more productive, and delivers a higher quality product than anything available presently.

Another object of the present invention is to provide a pickup head for a hay harvesting machine that is more reliable, more productive, and delivers a higher quality product than anything available presently while improving the reliability over conventional pickup heads.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 10A is a side view of a pickup head, depicting a spatial relationship between the skid shoes and the lifting roller 6.

PARTS LIST

Figure 1:
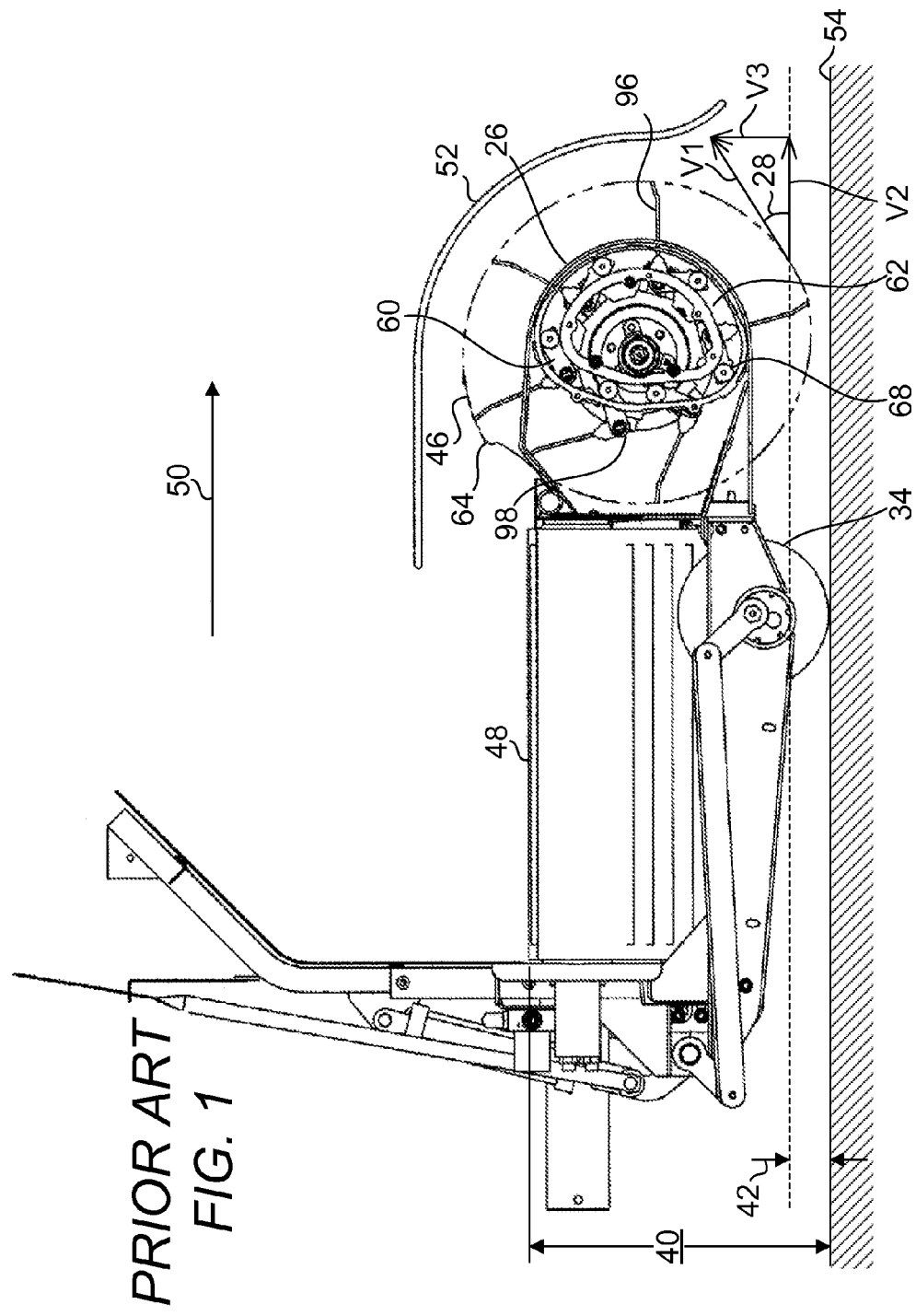
FIG. 1 is a right side view of a conventional pickup head, depicting the low vertical component of lifting force exerted by the pickup head.

2—pickup head
4—product
6—lifting roller
8—transfer roller
10—lofting roller
11—picking finger
12—tine
14—base of tine or block
16—retainer
18—slot
20—fastener, e.g., rivet
22—float control mechanism, e.g., air bag or spring
24—ground gauging device, e.g., skid shoe
26—stripper
28—lift angle
30—rocking axis of skid shoe
32—rocking axis of pickup head
34—wheel or skid shoe
36—outer surface of roller
38—base plate
40—height of conveyor
42—height of stubble
44—mounting slot
46—tine path boundary
48—conveyor or conveyor belt
50—travel direction
52—shroud
54—ground
56—lofting effector or disc
58—tube
60—arm
62—cam
64—throw point
66—endplate
68—tractor
70—merger
72—distance between two consecutive skid shoes
74—framework
76—cradle
78—mounting bar
80—drive sprocket
82—upper driven sprocket
84—lower driven sprocket
86—roller chain
88—idler
90—airbag guard
92—hydraulic motor and shaft
94—distance between two consecutive tines of the lifting roller in a direction parallel to the axis of rotation of the lifting roller
96—finger pair
98—bar
100—mounting pin
102—mounting aperture
104—horizontal distance between the rotational axis of lifting roller and front tip of skid shoe
106—angular spacing between two consecutive picking fingers within a plane of picking fingers

PARTICULAR ADVANTAGES OF THE INVENTION

The present pickup head is capable of producing more efficient lifting of product with a more aggressive lift angle, resulting in smoother windrows. As lifting of product is accomplished with increased efficiency, the need for a shroud or cover to help contain and channel lifted product and the need for stripping product from a product lifting device can be eliminated, eliminating work stoppages due to clogging of product in spaces where stripper and tines or shroud and roller/tines interface. The present pickup head involves fewer moving parts, assumes a simple design, allowing the possibility of combining more devices together to accomplish a far wider machine to service a larger area in a single pass and reduces the possibility of work stoppages due to scheduled or unscheduled maintenance. Conventional pickup heads include numerous moving parts, e.g., reciprocating parts, which are difficult to maintain and inherently unreliable. In conventional pickup heads, one single large-diameter, cam-controlled picking reel or, as in a few configurations, a wide sloped belt with fingers attached, are used. By contrast, the present pickup head involves using three simple revolving and intermeshing rollers, making the present pickup more effective and reliable. The quality of the windrow produced using the present pickup head is improved as in the reduction of lumps, wads, and unevenness of the windrows produced. The present pickup head may also be used in a forage harvester or baler which follows in the next operation or any devices involved in picking up cut hay or plant matters similar to hay.

The present pickup head includes a float control mechanism that is pneumatically effected. Compared to a float control mechanism that is hydraulically driven (e.g., using a hydraulic accumulator, the present pneumatically controlled float control mechanism (e.g., using an air bag) reacts more readily. Combined with the use of ground gauging device, the float control mechanism causes the pickup head to experience a reduced weight as only a portion of the weight of the pickup head is supported by the pickup head as the ground gauging device shares the load exerted by the pickup head, reducing wear and tear on the float control mechanism and maintenance required on the pickup head and the vehicle required to mobilize the pickup head. The use of the present ground gauging tool further reduces the amount of dirt and foreign materials in the product as the pickup point is precisely maintained at a distance from the ground at all times. Ground gauging at the point of pickup reduces ground contact and hence reduces the resulting damage to the machine and contamination of the product as the contact can cause dirt to be picked up along with the product and be retained through downstream processes. Ground gauging allows the pickup head to "float" over the contour of the ground more precisely.

Compared to conventional pickup heads, the present pickup head is more gentle on product and exerts little stress to cut hay and therefore capable of minimizing the loss of valuable alfalfa leaves or other products easily lost when a pickup head operates at high speed and in single stage. The present pickup head is capable of picking up products completely spread out in any direction and does not have to follow mowed windrows as with some conventional pickup heads. A small-diameter lifting roller results in a higher lift angle 28, allowing the use of lower rotational speed of the rollers and lower tip speed in lifting and transporting products and thereby causing less damage to the products.

The discharge portion of the present pickup is located at a height that is more prominent than a conventional pickup head, making it capable of distributing the lifted product more uniformly on a belt conveyor and resulting in a smoother windrow.

In the present pickup head, the ground 54 is sensed by using skid shoes across the entire width of the head rather than just on each widthwise end of the pickup head in the case of conventional pickup heads. The present pickup head therefore exerts lower pressure on the ground and causes less damage to the ground while more suitably supporting the pickup head. When the skid shoes are also used as a ground gauging tool, the skid shoes that are disposed across the width of the pickup head, increasing the likelihood that the ground is suitably gauged.

The product engaging roller of the present pickup head includes a plurality of staggered picking fingers, to reduce the opportunity to inadvertently pick up stones or other obstacles or unintended materials. Conventional pickup heads include tine pairs where tines of each tine pairs are closely disposed and the tips of the tine-pairs traveling at the same surface speed, increasing the ability of the tines to pick up and send large stones and other obstacles downstream from the pickup head.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

The term "product" is used herein to mean any materials, e.g., plants, that are loosely disposed on grounds where the product has been fallen, e.g., cut or mowed grass or hay, e.g., alfalfa, leaves, crops, e.g., corn, barley and wheat stalks, vine crops and windrowed beans.

FIG. 1 is a right side view of a conventional pickup head, depicting the low vertical component of lifting force exerted by the pickup head. The existing tine path boundary 46 assumes a path that is about 28 inches in diameter. Those familiar with the industry would agree that a 3-inch "stubble" or cut height 42 is ideal for most hay cutting. A 3-inch line is depicted above the ground level. In order to illustrate the lifting force of the pickup head, a simple vector diagram having components V1, V2, V3 has been established at the point where the tine path intersects the 3-inch cut height. At this typical picking height, the vector diagram indicates that the forward or pushing component is significantly larger than the vertical or lifting component. This creates a situation where, especially in a lighter yielding crop, the product tends to kick forward and build before it finally picks up. This results in a lumpy, uneven windrow and greatly affects the performance of the following harvesting operation be it a forage harvester ("chopper") or a baler.

Traditional windrow merging machines in general use a conventional tooth-type head that consists of a plurality of flexible steel pins 96, each secured to an elastomer block 14 which is in turn adhered to a base plate 38. The number and axial spacing of the picking fingers dictate the overall length of the head which is typically 10 ft. or 3 meters. This width is generally accepted in the United States as the maximum desired width to move safely down the highway and is the law in most European countries. The picking fingers are mounted on bars that rotate in bearings and are controlled by arms 60 that run in a cam 62 trough. The resultant motion of the tooth is that it aggressively lifts the product from the ground, elevates it to a desired height, throws the product onto a conveyor belt, retracts to clear other parts of the structure, and then re-orients to begin another cycle. FIG. 1 also shows an end view of the conveyor belt. As a conveyor belt includes supporting gauge wheels 34, its related structure and the belt "droop," it is apparent that the overall height of the belt conveying surface must be maintained at a realistic height 40, e.g., about 24 inches, from the surface of the ground. In prior art technologies, it has been a challenge to pick the product from the ground and place it on the belt sufficiently far back so that it is evenly distributed and this thrown product on the belt is simultaneously being joined by products thrown onto the belt from a further extreme of the machine.

Referring to FIG. 1, a conventional design as described and shown must lift the product from the ground and deposit onto the conveyor belt. In order to get the product as far back on the belt as possible, the "throw point" 64 needs to be at least about 5 inches above the belt. It would be desirable to have this even higher but it would require a larger diameter tine path. Referring to FIG. 1, shrouds 52 may also become incorporated with the pickup head. The purpose of such shrouds 52 is to hold the crop against the finger pairs 96 so that a more positive flow of material is achieved, resulting in an improved discharge onto the belt conveyor. Shrouds also allow the pickup head to be run faster, i.e., at higher rotational speed without causing the materials to be picked up to become airborne and valuable alfalfa leaves to be lost. One obvious result is increased component wear that accompanies increased rotational speed. Some of the shrouds become very difficult to mount because any mounting brackets tend to interfere with material flow and disrupts any advantages of having combined heads to attain a 30-foot wide or wider continuous pickup device. The pickup head depicted in FIG. 1 functions by revolving bars 98 on which finger pairs 96 are attached using cam followers 68 which in turn follow a path of a cam 62. The cam 62, cam followers 68, finger pairs 96, and bars 98 are all high wear items and if a less than attentive operator runs the machine into the ground often, the wear and subsequent failure and downtime become an issue. Attempts have previously been made to address this problem by incorporating a wide belt with teeth affixed to engage the crop with a very small diameter and therefore a more effective lifting component. This appears to work somewhat better at the pickup point but belts historically have their own problems including high initial and replacement cost, inclusion of material inside and time consuming repair. Materials can enter from edges of the belt and become trapped around sheaves and eventually stall the belt, causing significant downtime and costly maintenance.

Figure 2:
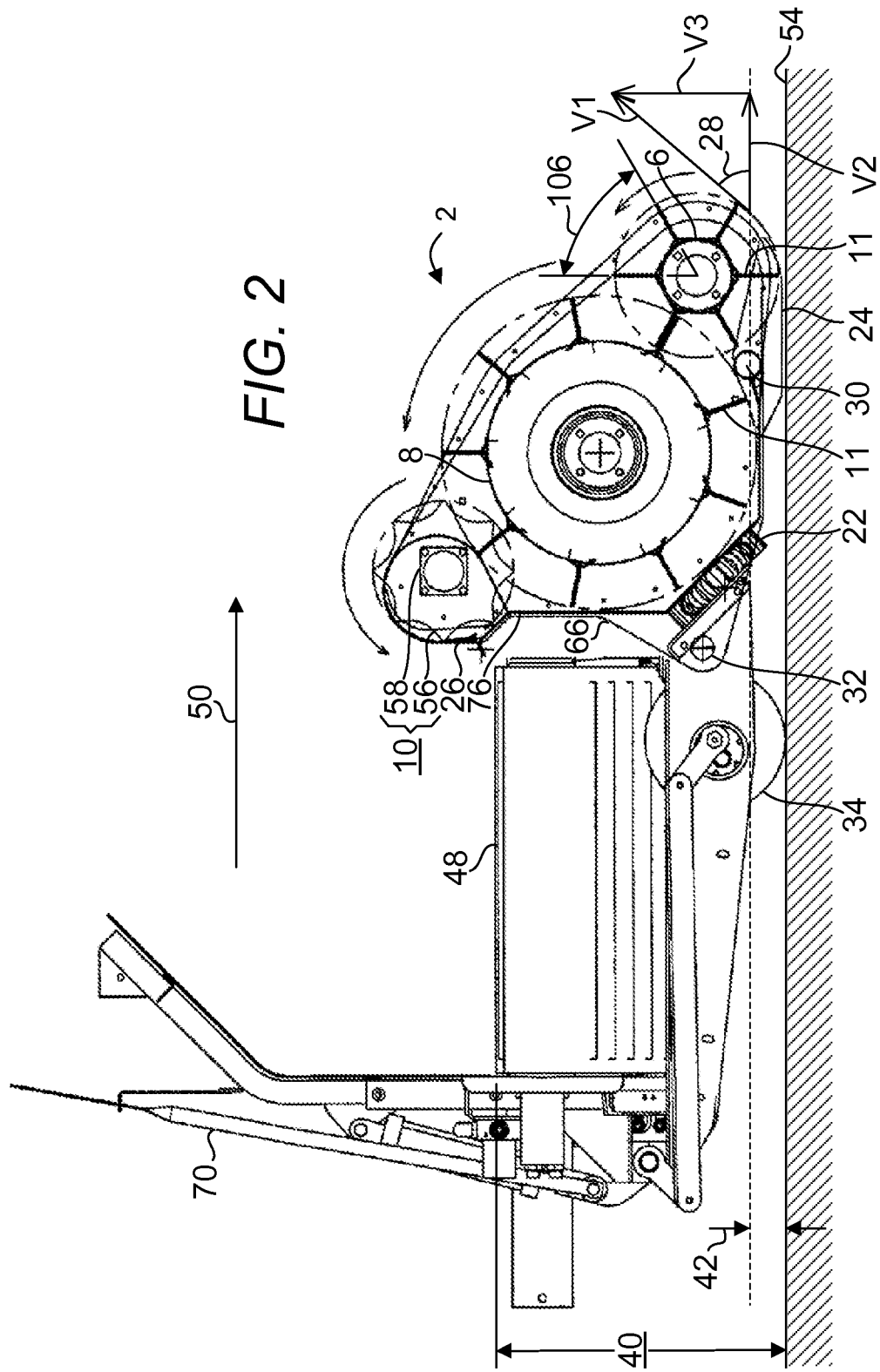
FIG. 2 is a right side view of a pickup head according to the present invention.
Figure 3:
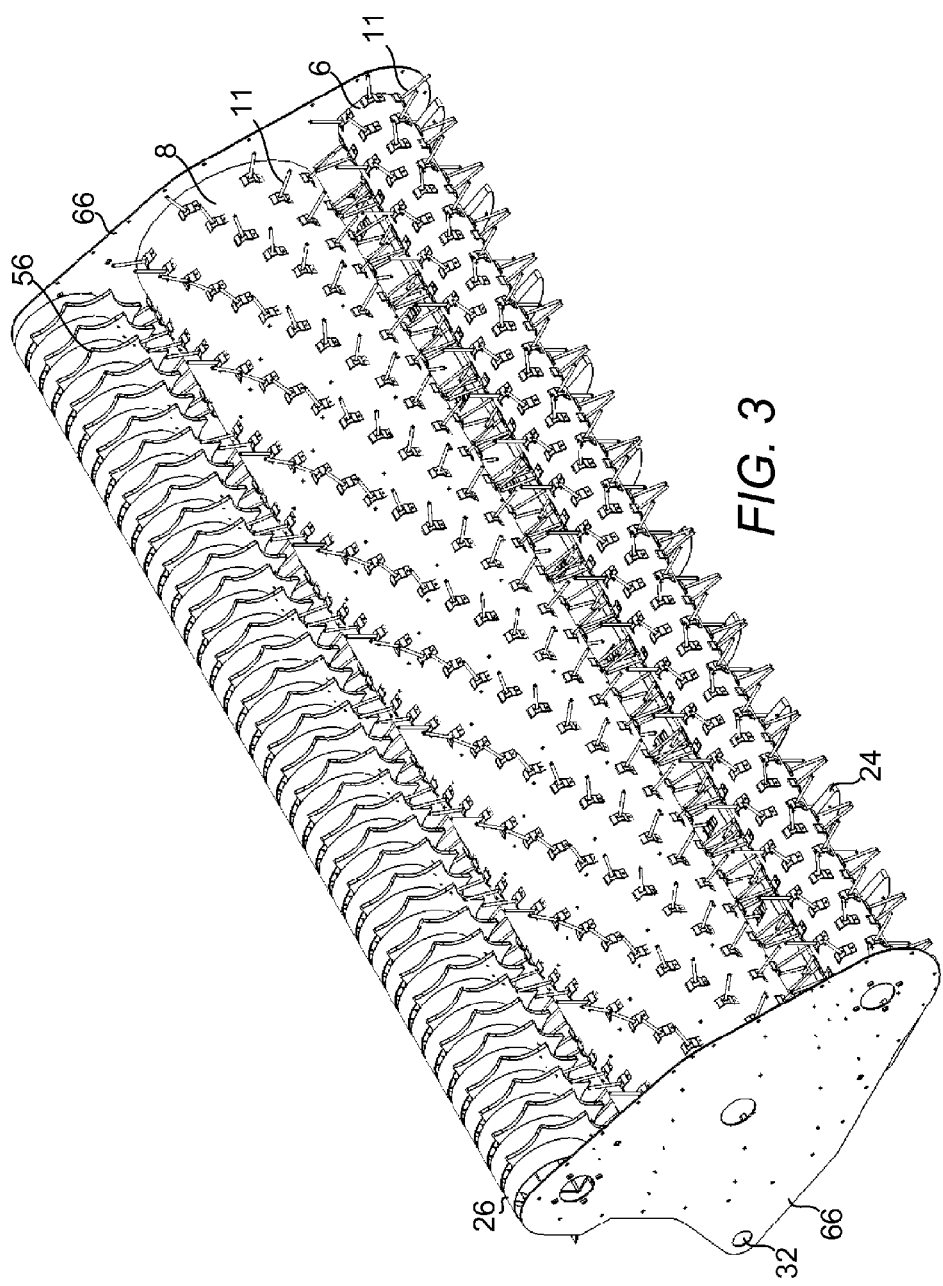
FIG. 3 is a top front perspective view of a pickup head according to the present invention.
Figure 4:
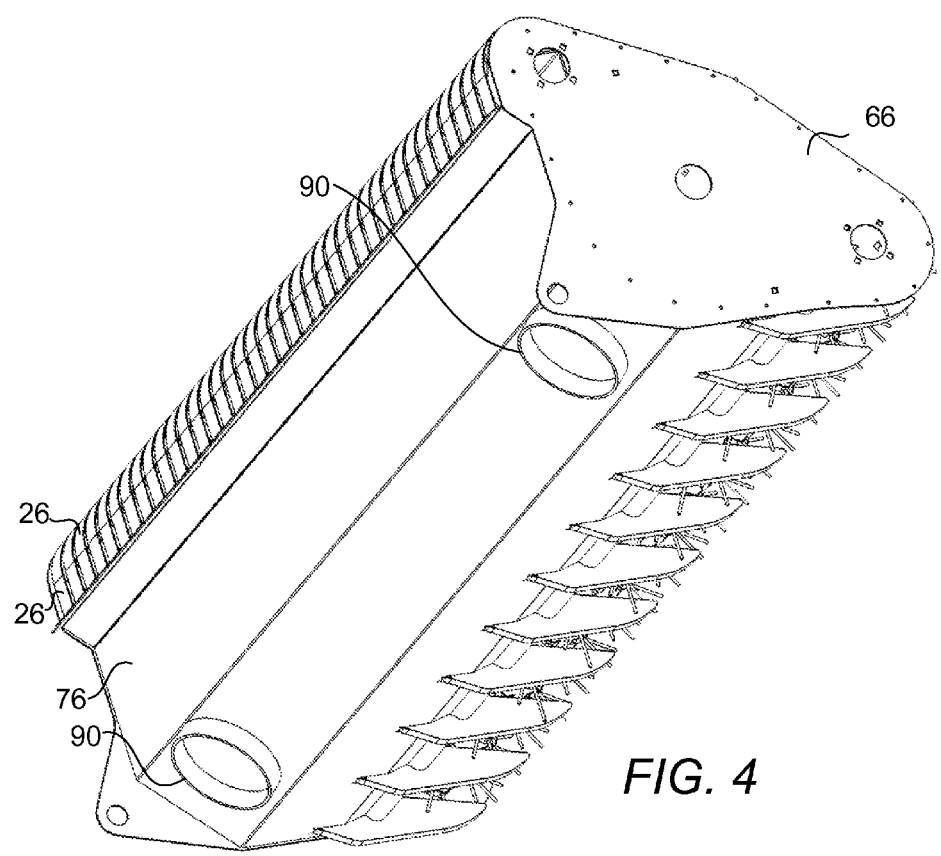
FIG. 4 is a bottom rear perspective view of a pickup head according to the present invention.
Figure 5:
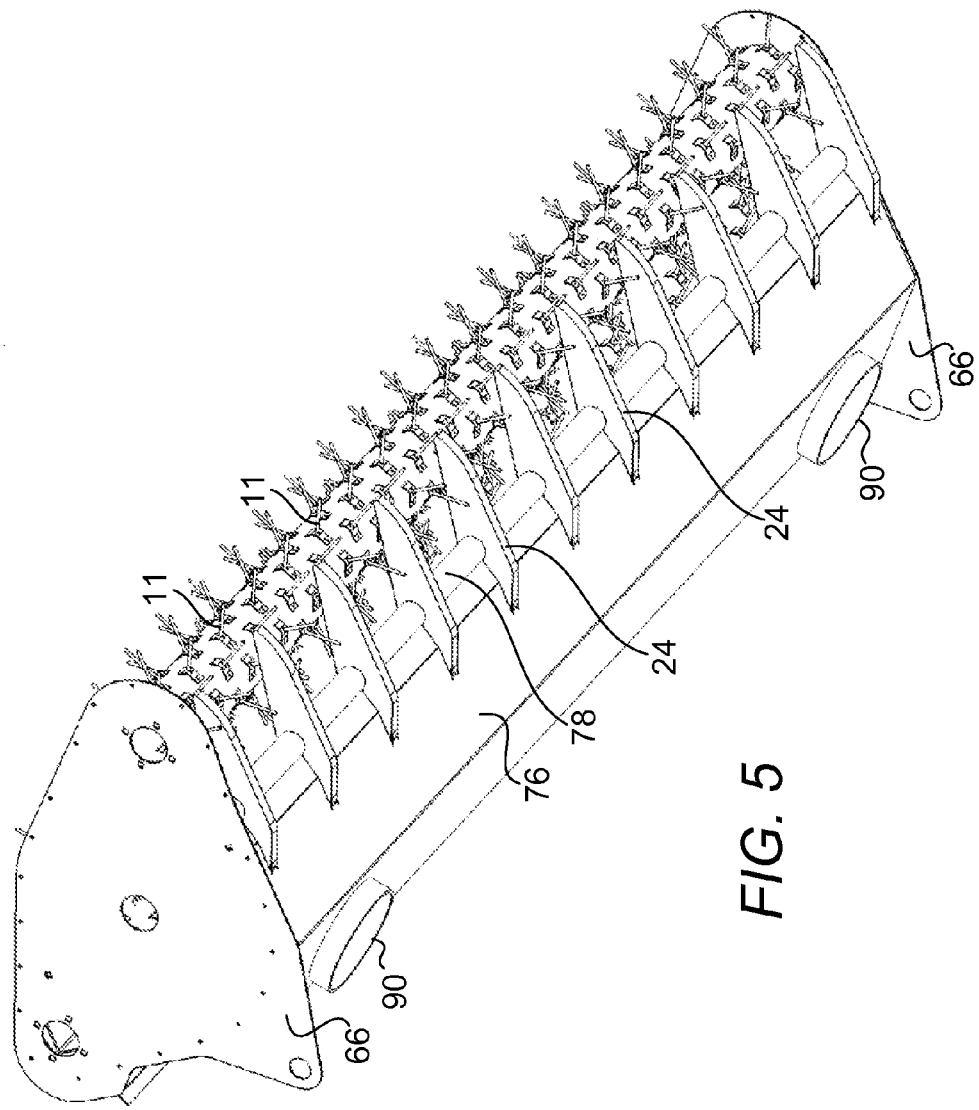
FIG. 5 is a bottom front perspective view of a pickup head according to the present invention.
Figure 6:
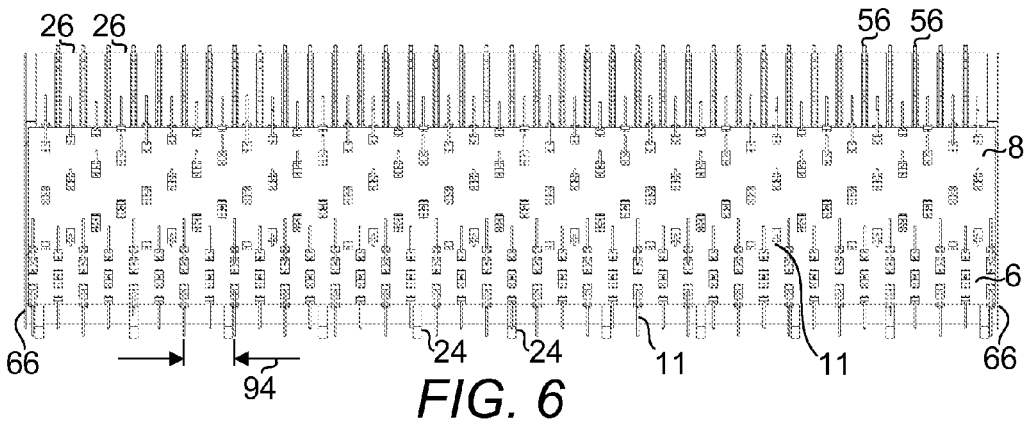
FIG. 6 is a front view of a pickup head according to the present invention.
Figure 7:
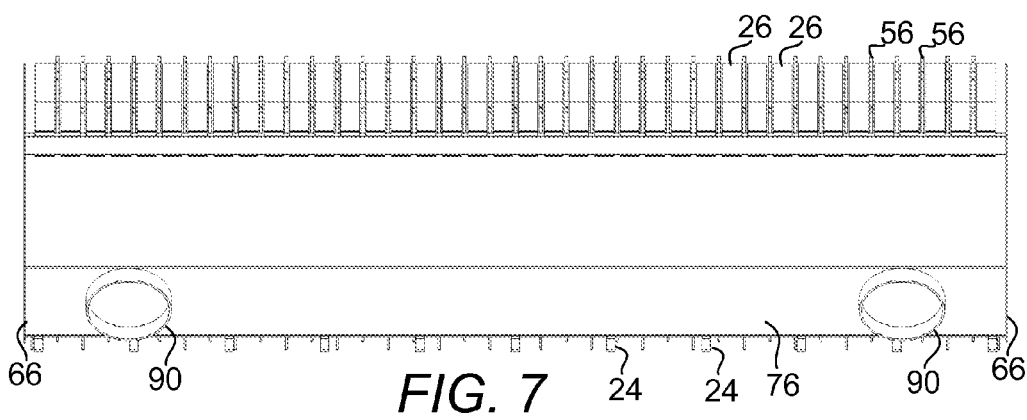
FIG. 7 is a rear view of a pickup head according to the present invention.
Figure 8:
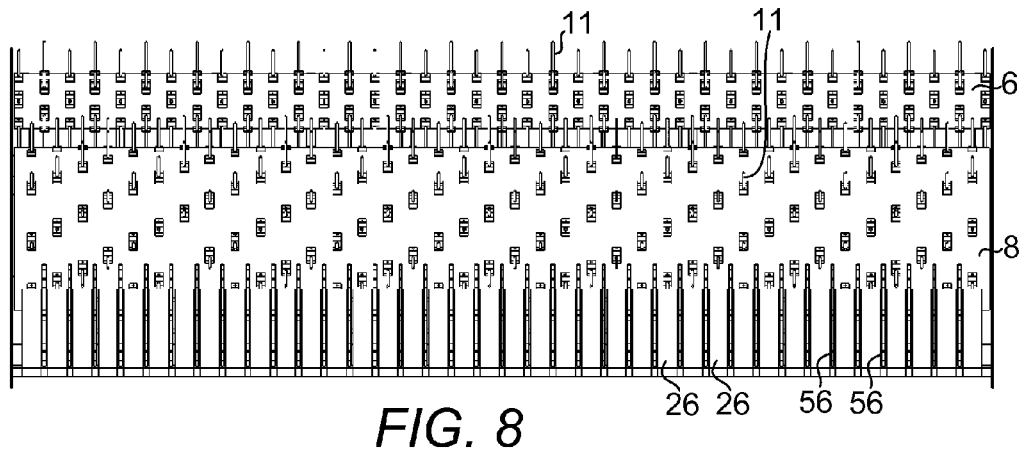
FIG. 8 is a top view of a pickup head according to the present invention.
Figure 9:
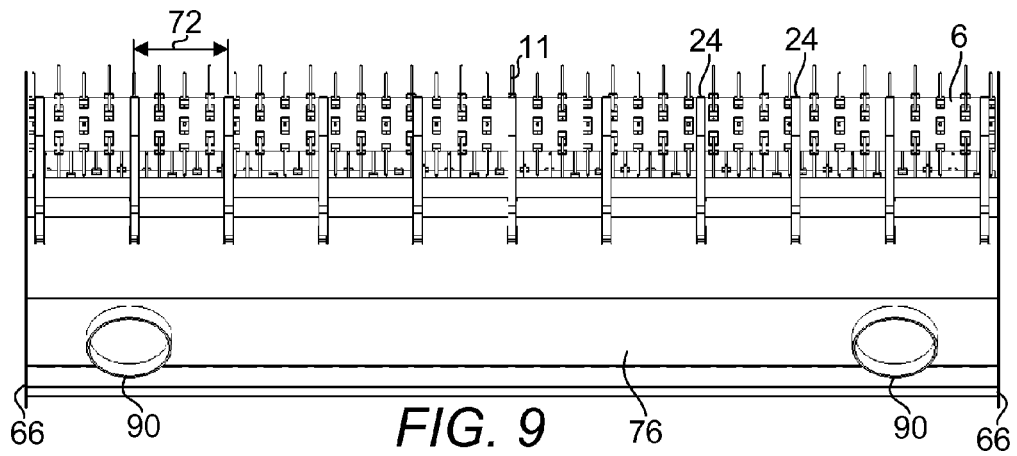
FIG. 9 is a bottom view of a pickup head according to the present invention.

FIG. 2 is a right side view of a pickup head according to the present invention. FIGS. 3-9 are various views of a pickup head according to the present invention. Compared to the pickup head of FIG. 1, all conventional cams, fingers, bars, arms, cam followers, and mounting structure have been eliminated and replaced with a three-stage device including a lifting roller 6, a transfer roller 8 and a lofting roller 10. Disclosed herein is a pickup head 2 having a width, a materials lifting end and a materials lofting end. In one embodiment, the width of the pickup head capable of engaging a product ranges from about 10 ft to about 12 ft. The pickup head 2 includes a lifting roller 6, a transfer roller 8 and a lofting roller 10. The lifting roller 6 is adapted to rotate about a first axis of rotation and disposed on the materials lifting end, the lifting roller 6 including a cylindrical tube having two opposingly disposed ends, an outer surface, a first diameter and a plurality of picking fingers 11 protruding from the outer surface of the cylindrical tube of the lifting roller 6. In one embodiment, the first diameter measures about 6 inches. The distance between two consecutive picking fingers 11 of the lifting roller 6 in a direction parallel to the first axis of rotation is no less than about 6 inches. The transfer roller 8 is adapted to rotate about a second axis of rotation, the transfer roller 8 including a cylindrical tube having two opposingly disposed ends, an outer surface, a second diameter and a plurality of picking fingers 11 protruding from the outer surface of the cylindrical tube of the transfer roller. The transfer roller 8 is disposed at an elevation higher than the lifting roller 6 between the materials lifting end and the materials lofting end. In one embodiment, second diameter measures about 19 inches and the transfer roller 8 is fabricated from 16 Gauge (0.063-inch) steel. A tube of such size is not commercially available and therefore must be fabricated from a flat sheet. The holes and slots to mount the picking fingers 11 are created in a flat sheet by punching or laser cutting. Upon creating such holes and slots, the sheet is rolled into the shape of a tube, and is seam welded. Suitable reinforcing structure may be used to enhance the structural integrity of the tube.

The lifting roller 6 is configured to lift materials disposed upstream of the materials lifting end of the pickup head 2 while the pickup head 2 advances in the direction from the materials lifting end to the materials lofting end, the transfer roller 8 is configured to receive materials lifted with the lifting roller 6 and conveying the materials to the lofting roller 10, which subsequently lofting the materials downstream from the materials lofting end of the pickup head 2. A cradle 76 disposed at suitable clearances from the lifting 6, transfer 8 and lofting 10 rollers provides structural rigidity to the pickup head while serving as engagement stations for a float control mechanism disclosed elsewhere herein and a catch tray for products that may fall in the gaps between the rollers 6, 8, 10 such that they may be re-lifted and transported to the conveyor belt 48. Suitable materials for constructing the lifting and transfer rollers include, but not limited to, fiberglass, aluminum and steel.

The present pickup head further includes a plurality of strippers 26 disposed on the lofting roller 10, where each stripper is configured to separate materials reaching the lofting roller from their tendency to continue to be rolled into the space defined by the cradle 76.

The present pickup head further includes a float control mechanism adapted to adjust the weight the pickup head 2 exerts on the ground. In one embodiment, the float control mechanism is an air bag 22 having a first end and a second end, wherein the first end is adapted to urge against the pickup head 2 and the second end is adapted to urge against a portion of the (conveyor) frame to which the picked head is mounted. If the air bag is increasingly inflated, the pressure exerted by the pickup head on the ground via skid shoes, is reduced as a smaller portion of the weight of the pickup head is supported by the ground and if the air bag is increasingly deflated, the pressure exerted by the pickup head on the ground via skid shoes, is increased as a larger portion of the weight of the pickup head is supported by the ground. In one embodiment, two air bags are used, one on each lengthwise end of the pickup head. The pressure of the one or more air bags can be varied by a regulated pressure air supply on the tractor which propels the pickup head. In one embodiment, each air bag is contained within an airbag guard 90, which not only secures the air bag but also acts as a limiter where a fixed minimum distance is kept between the cradle 76 and the frame to which the pickup head is mounted. In one embodiment, an airbag guard 90 is a short cylindrical tube with one of its ends attached to a portion of the outer surface of the cradle 76. An airbag guard may alternatively be attached to the conveyor end of a merger instead. By floating the pickup head, a far smaller mass can be more precisely floated over the ground. This "floating" is desirable to prevent the head from diving into the ground or from bouncing and missing crop or damaging the cut crop preventing regrowth. Referring to FIG. 1, it can be seen that the head and conveyor are rigidly attached. The entire mass of the pickup head is supported by a gauge wheel 34 or in some cases, a skid plate. Various combinations of springs and hydraulics have been used in the industry to "float" or unweight the entire pickup head so that it leaves a lighter footprint upon the soil while still following the contour of the ground. It is a challenge to get this much mass to react quickly. The present float control mechanism addresses this challenge.

In one embodiment, the present pickup head further includes a ground gauging device 24. In one embodiment, the ground gauging device 24 comprises a plurality of skid shoes 24 distributed along the width of the pickup head 2 and each of the plurality of skid shoes 24 is disposed at a distance 72 no more than about 12 inches from one another such that the height of the lifting roller 6 from the ground is maintained.

The lofting roller 10 is a reel of about 12-inch diameter, including a plurality of discs 56 spaced axially at about 3-inch pitch and so located to intermesh with the picking fingers 11 of the transfer roller 8. In one embodiment, these discs are constructed from plastic and are mounted on a square fiberglass tube 58 that is about 4-inch×4-inch. As in the lifting roller 6, fiberglass is used for rigidity and weight savings, although other materials with suitable rigidity, e.g., aluminum and steel may also be used. As the lofting roller 10 represents the last stage prior to receiving materials from the transfer roller 8, it becomes necessary to guard or fill the gap between these discs to prevent wrapping of harvested crop on the square tube. The lofting roller 10 is adapted to rotate about a third axis of rotation and disposed at an elevation higher than the transfer roller 8 at the materials lofting end.

Figure 10:
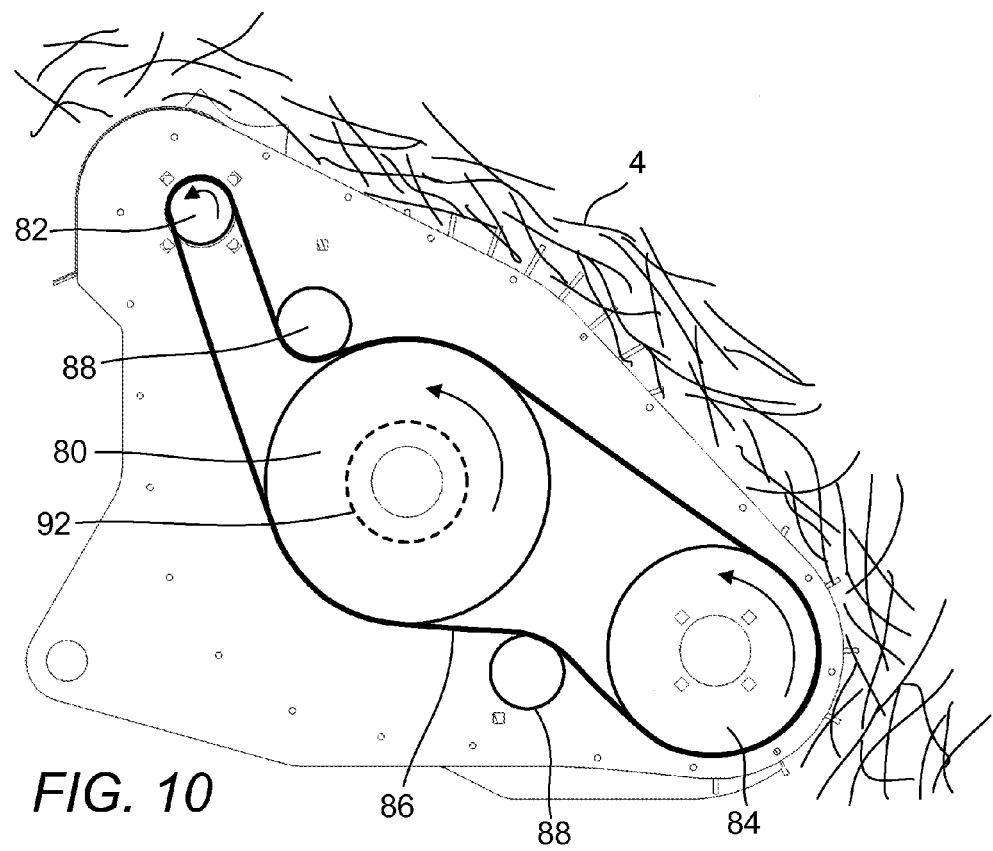
FIG. 10 is a side view of a pickup head according to the present invention, depicting a mechanism for driving the rollers of the pickup head.

FIG. 10 is a side view of a pickup head according to the present invention, depicting a mechanism for driving the pickup head with product 4 shown as being moved from the materials lifting end to the materials lofting end. In one embodiment, a hydraulic motor is mounted on one endplate 66 already with suitable displacement for proper torque and speed at the motor output. The hydraulic motor 92 is preferably disposed within a cavity of the transfer roller 8 for space savings or compact configuration. The motor output is coupled through the transfer roller 8 to a drive sprocket 80 disposed and supported on the opposite endplate 66 from the endplate on which the hydraulic motor 92 is disposed where the drive sprocket is coaxially connected with the transfer roller 8. An upper driven sprocket 82 is coaxially connected to the lofting roller 10 while a lower driven sprocket 84 is coaxially connected to the lifting roller 6. A closed loop roller chain 86 is operably engaged with the upper driven sprocket 82, driving sprocket 80 and lower driven sprocket 84 such that a rotation of the driving sprocket 80 causes rotation of the upper driven sprocket 82 and the lower driven sprocket 84. Idlers 88 tension the chain 86 against the drive 82 and driven sprockets 82, 84. All rotational components are supported on bearings and other suitable friction-reducing devices.

FIG. 10A is a side view of a pickup head 2, depicting a spatial relationship between the skid shoes 24 and the lifting roller 6. A plurality of skid shoes 24 are distributed along the width of the pickup head 2. If the skid shoes 24 are mounted excessively forward of the pickup head 2, they can damage the products to be picked up or otherwise prevent the pickup of the products as they slide above the products. Therefore, it is imperative to mount the skid shoes 24 to provide ground gauging while not inhibiting products pickup. It shall be noted from FIG. 10A that there is a point at which the line representing the stubble height 42 intersects the tine path of the lifting roller 6. A dotted vertical line is drawn from this point to represent the horizontal limit at which the tip of the skid shoes are to be disposed. In one embodiment, a skid shoe 24 is mounted such that the horizontal distance 104 between the rotational axis of the lifting roller 6 and the front tip of skid shoe 24 is about 2 inches.

In the ensuing disclosure, the lift component of the present pickup head is contrasted to that of the conventional pickup head. Referring to the vector diagram V1, V2, and V3 in FIG. 1, the vertical lifting component V3 is about 64% of the undesirable "pushing" component V2. By contrast, the present vertical lifting component is about 118% of the undesirable V2 as shown in FIG. 2. Referring to FIG. 2, the lifting roller 6 must lift the crop from the ground but gently enough to not damage it or cause loss of the valuable leaves, e.g., alfalfa leaves. The tip speed of a roller is defined as the speed as experienced at the tip or the free end of a tine of the roller. In one embodiment, a tip speed of about 550 feet per minute (fpm) or 6.25 miles per hour (mph) is provided at the lifting roller 6. This is attained by starting with 100 Revolutions Per Minute (RPM) at the motor output which directly drives the transfer roller 8, and with the use of chain 86, creates an overdrive of about 1.5:1 overdrive to the lifting roller 6. The same rotational speed of the transfer roller 8 results in a tip speed of about 699 fpm or 7.9 mph at the transfer roller 8. This slightly higher rotational speed at the transfer roller 8 is intended to gently accelerate the product as it is being lifted from the ground. The lofting roller 10 is overdriven at a ratio of about 4.31:1 in a similar manner through the same chain 86. This results in a more drastic velocity increase to about 1,348 fpm or 15.3 mph which has proven to be sufficient to place the product back on the conveyor belt sufficiently so there is room for more product to be added smoothly. Therefore, in one embodiment, the ratio of the lifting tip speed to the transferring tip speed is 550/699 or about 0.79 and the ratio of the transferring tip speed to the lofting tip speed is 699/1,348 or about 0.52. Such ratios may be adopted when selecting the appropriate drive, upper driven and lower driven sprockets 80, 82, 84. The ratio of the lifting tip speed to the transferring tip speed and the ratio of the transferring tip speed to the lofting tip speed may be adjusted according the crops or products for which the present pickup head is intended.

Figure 11:
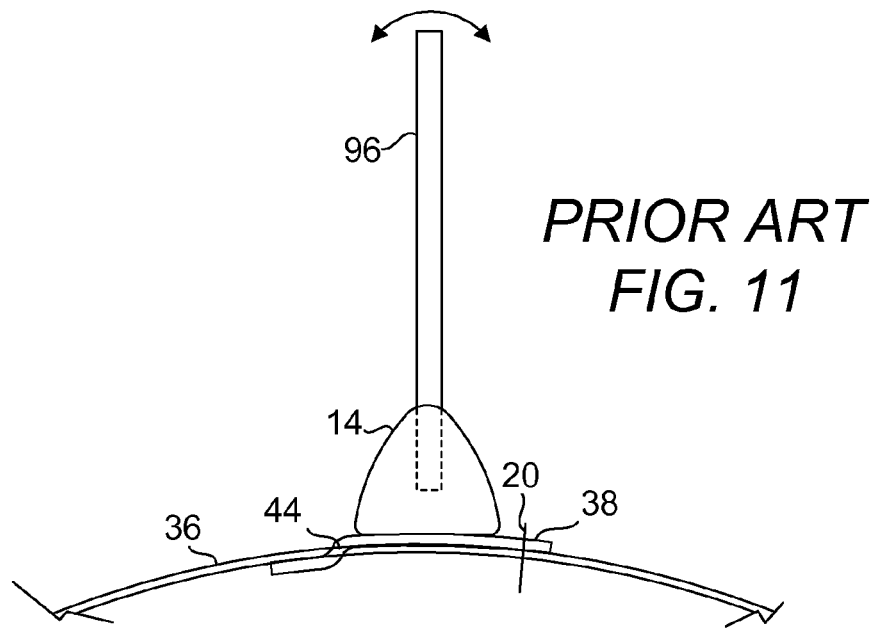
FIG. 11 is a side view of a conventional picking finger.
Figure 12:
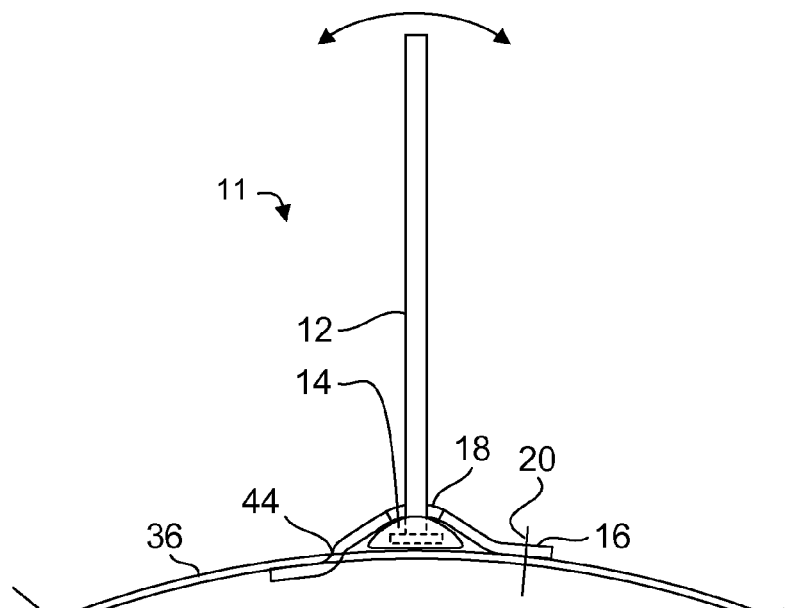
FIG. 12 is a side view of one embodiment of a picking finger according to the present invention.
Figure 13:
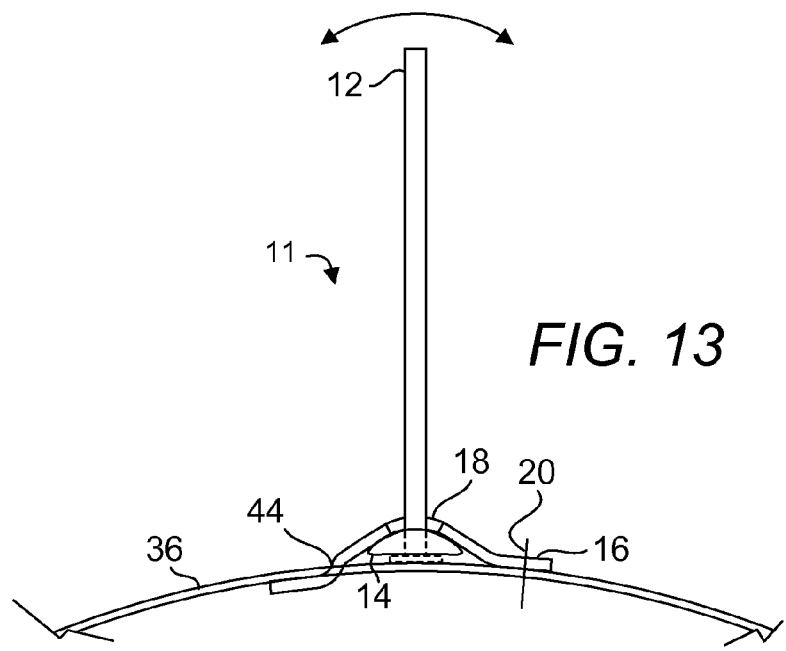
FIG. 13 is a side view of another embodiment of a picking finger according to the present invention.
Figure 14:
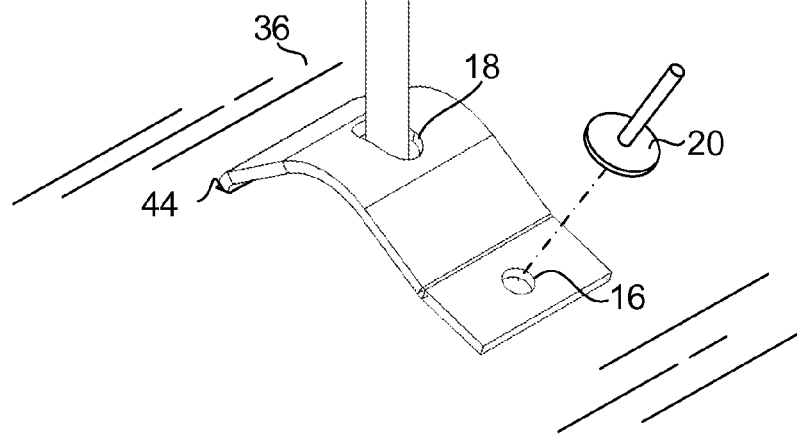
FIG. 14 is a top front perspective view of another embodiment of a picking finger according to the present invention.

The picking fingers 11 of the lifting roller 6 are disposed at a 3-inch pitch in a direction parallel to the rotational axis of the lifting roller 6. The picking fingers 11 of the transfer roller 8 are disposed on the same 3-inch pitch in a direction parallel to the rotational axis of the transfer roller 8 but shifted one half pitch so that they intermesh with the picking fingers 11 of the lifting roller 6. Picking fingers 11 of the transfer roller 8 are arranged in a configuration relative to the picking fingers 11 of the lifting roller 6 such that the product lifted by the lifting roller 6 is stripped off the lifting roller 6 and prevented from continuing in its path in the space between the lifting roller 6 and the transfer roller 8. Several designs of picking fingers have been tried without success. These include flat plastic discs of various tooth profiles, brushes, rubber fingers, and thin steel tines. It was finally determined that conventional steel teeth with thickness of about 0.18 inch to about 0.25 inch diameter is the best solution. FIG. 11 is a side view of a conventional picking finger. A tine 96 is secured at one end to an elastomer block 14. The elastomer block 14 is in turn attached to a base plate 38 which is then inserted through a mounting slot 44 and secured at one end and riveted on the other end. FIG. 12 is a side view of one embodiment of a picking finger 11 according to the present invention. FIG. 13 is a side view of another embodiment of a picking finger 11 according to the present invention. FIG. 14 is a top front perspective view of another embodiment of a picking finger 11 according to the present invention. A plurality of picking fingers 11 are mounted on the lifting roller 6 and the transfer roller 8. Each picking finger 11 includes a base 14, a tine 12 having a top end and a bottom end, the bottom end of the tine 12 is attached to the base 14, a retainer 16 having a cavity and a slot 18 disposed on the retainer 16. The tine 12 is configured to be inserted through the slot 18 with the top end of the tine 12 first such that the base 14 is configured to be seated within the cavity and the retainer 16 configured for attachment to the outer surface of the lifting roller 6 or the transfer roller 8.

In securing a retainer 16 to a lifting roller 6 or a transfer roller 8, a mounting slot 44 is provided on such roller to accommodate one end of the retainer 16 configured for insertion and removable attachment into such mounting slot 44 and the other end of the retainer 16 secured by a fastener, e.g., a rivet 20, onto the outer surface of the lifting roller 6 or the transfer roller 8. FIGS. 12 and 13 show one end of the tine 12 secured in an elastomer block, either formed integrally as in FIG. 12 or as a tine 12 having a head inserted through an opening in an elastomer block 14 as in FIG. 13. Some flexing of the tine 12 with respect to the elastomer block 14 is already afforded in all cases shown in FIGS. 11-14. Allowing the based tine to protrude through a slot 18 of a retainer enables flexing. A conventional tine design as shown in FIG. 11 requires the tine to be successfully bonded to the elastomer block 14 which allows it to flex. A tine such as this can often become unbonded and lost in the field if the tine is separated from the elastomer block 14 due to a variety of reasons, e.g., impact of the tine with stones, rocks, branches, etc. Many industries such as the vegetable industry can tolerate this as the tine will cause no further damage and will eventually corrode and disappear. However the dairy industry cannot tolerate this as the tine could end up in the product being fed to valuable milk producing animals. The present tine does not need to rely on adhesion of the tine to as elastomer block 14 as in the case of FIG. 11 to prevent separation. The head or base on the tine is contained by the retainer 16 and the elastomer block 14 merely provides flexing. There exists a significantly reduced risk of losing a tine due to the separation of a tined block from the plate upon which it is attached as in the case of FIG. 11. A present tined block does not rely on adhesion alone to retain the block but rather a retainer 16 to positively secure the block in place. In one embodiment, the hardness of the present elastomer ranges about 50 to about 70 Shore A hardness range. In one embodiment, the tines 12 of the picking fingers 11 are constructed from steel. Referring back to FIG. 2, the angular spacing 106 of these tines about the rotational axis of the lifting roller 6 is about 60 degrees but could be more or less to suit varying conditions and demands. Notice that only picking fingers 11 that are disposed on a single plane that is perpendicular to the axis of rotation of the respective roller 6, 8 are depicted. Therefore, as depicted in FIG. 2, in a single first plane of picking fingers 11 on the lifting roller 6, there is a total of 6 picking fingers 11. In a second plane adjacent that of the first plane of fingers shown for the lifting roller 6, there are six picking fingers but the picking fingers 11 in this adjacent second plane are angularly offset at about 30 degrees about the rotational axis of the lifting roller 6 with respect to the picking fingers 11 of the first plane. The second plane is disposed at a distance of about 3 inches from the first plane along a direction parallel to the rotational axis of the lifting roller 6. As a result of such arrangement, there are therefore no two adjacent or consecutive picking fingers 11 that are disposed in a manner in which the distance between the two consecutive picking fingers 11 in a direction parallel to the rotational axis of the lifting roller 6 that make them suitable to work in concert to inadvertently scoop a stone and obstacle, eliminating the tendency that exists in two conventional adjacent picking fingers that are narrowly spaced to scoop a stone or obstacle from the ground. It shall be noted that although the first and second planes are disposed about 3 inches apart, no two picking fingers, one from each plane, are aligned in a direction parallel to the rotational axis of the lifting roller 6. A third plane of picking fingers 11 that is adjacent to the second plane of picking fingers 11 mirrors the arrangement of picking fingers 11 as those disposed on the first plane. However, the third plane is disposed at about 6 inches from the first plane in a direction parallel to the rotational axis of the lifting roller 6. Such arrangement continues from one longitudinal end to the other longitudinal end of the lifting roller 6 and enables pickup of products and not stones or obstacles. The arrangement of picking fingers 11 on transfer roller 8 is similar to those of the picking fingers 11 on the lifting roller 6 with the exception that the angular spacing between two adjacent picking fingers 11 within a plane may be different and angular offset between picking fingers 11 within two adjacent planes may be different.

Figure 15:
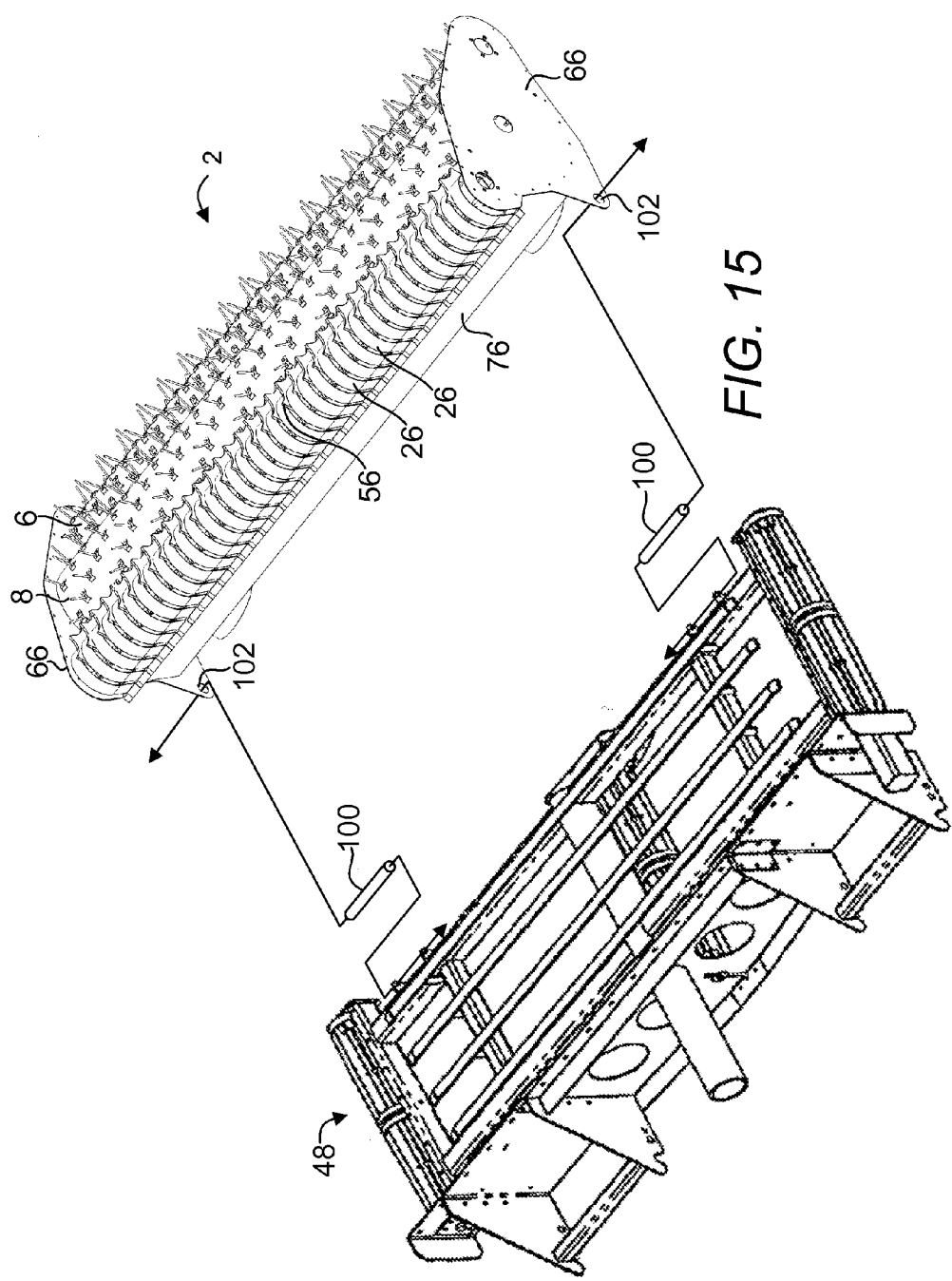
FIG. 15 is a top rear perspective view of a pickup head arranged for attachment to a conveyor.

FIG. 15 is a top rear perspective view of a pickup head 2 arranged for attachment to a conveyor 48. The conveyor 48 is shown with its belt removed to reveal its underlying components. Referring back to both FIGS. 2 and 15, a mounting pin 100 is shown configured for attachment to one widthwise end of the conveyor 48. A pin of each mounting pin 100 is configured to be inserted through a mounting aperture 102 of the pickup head such that the pickup head 2 is pivotably mounted to the conveyor 48 about the rocking axis 32 of the pickup head.

Figure 16:
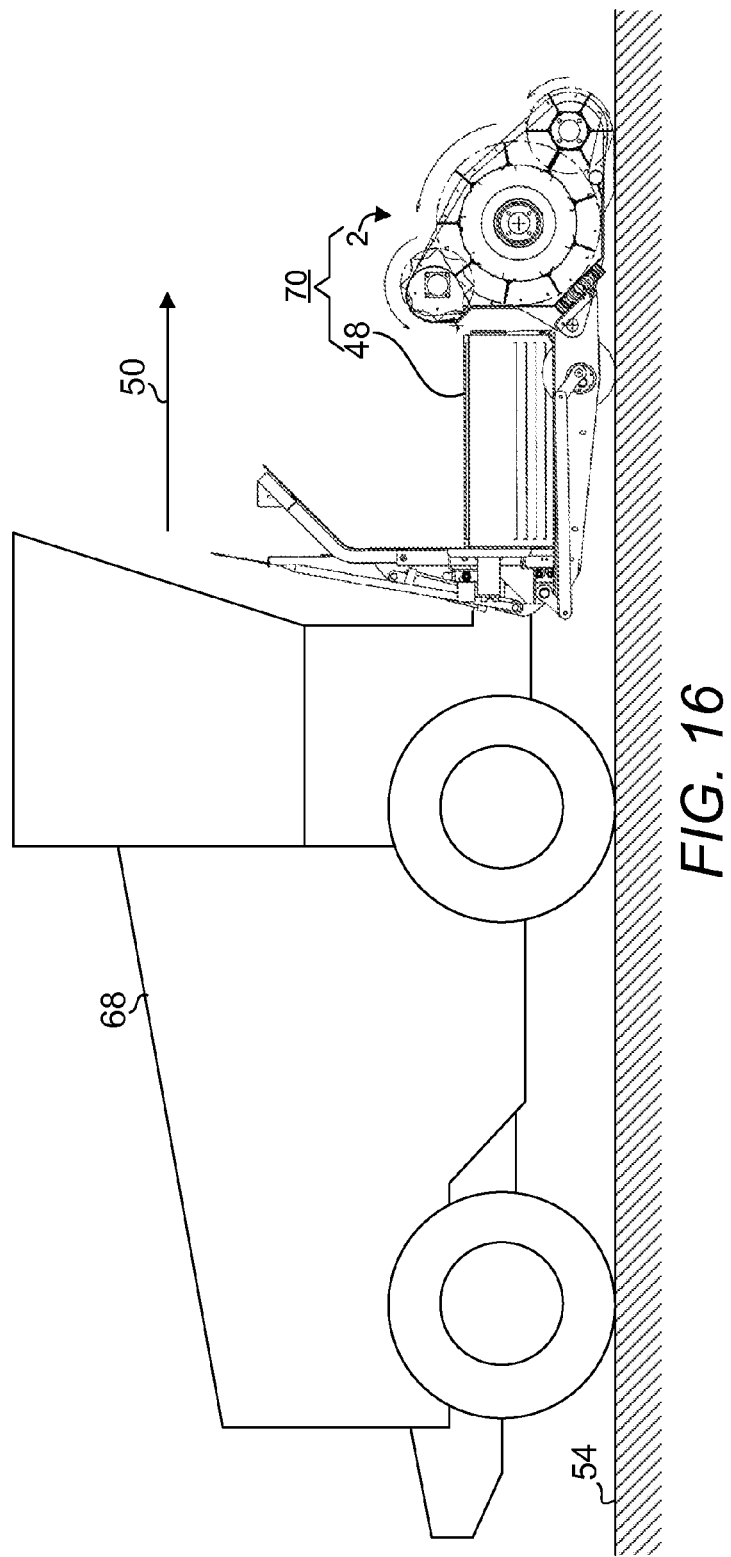
FIG. 16 is a side view of a pickup head functionally attached to a tractor configured to push the pickup head.
Figure 17:
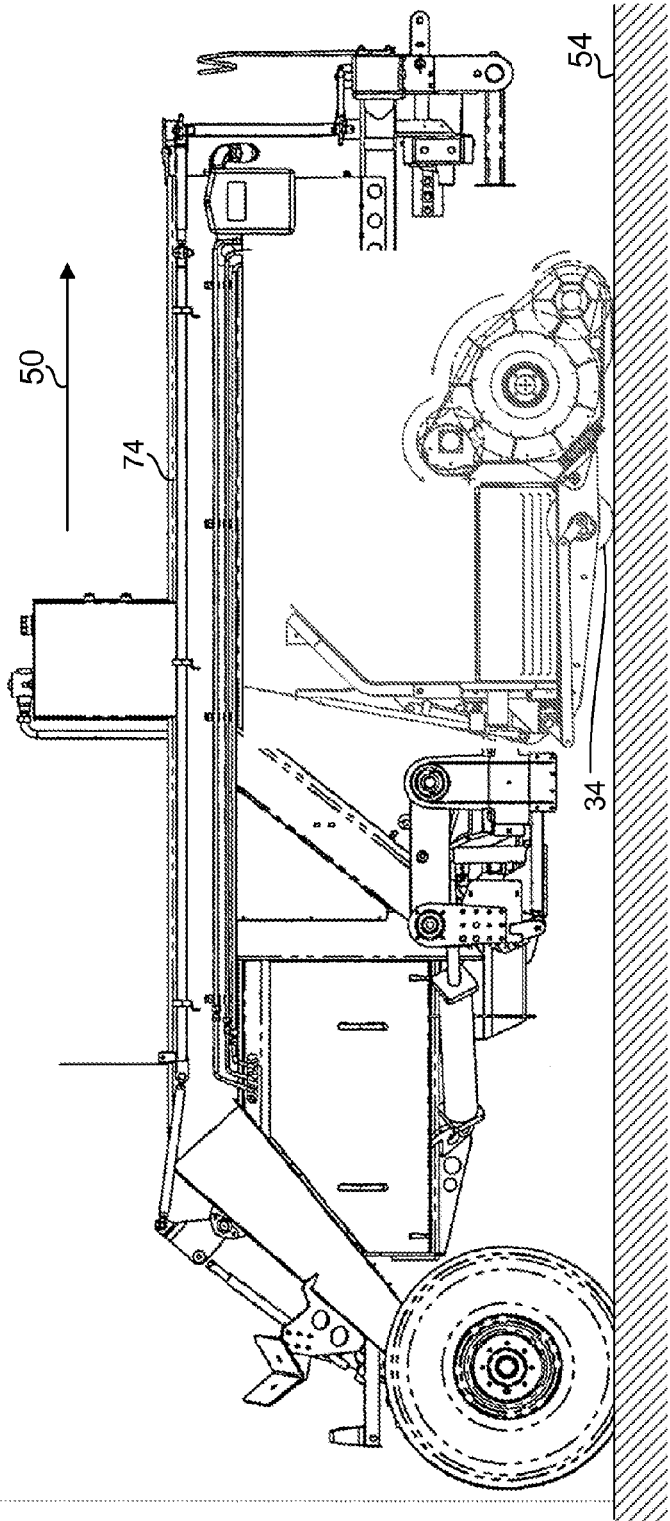
FIG. 17 is a side view of a pickup head functionally attached to a framework configured to be towed using a tractor.
Figure 18:
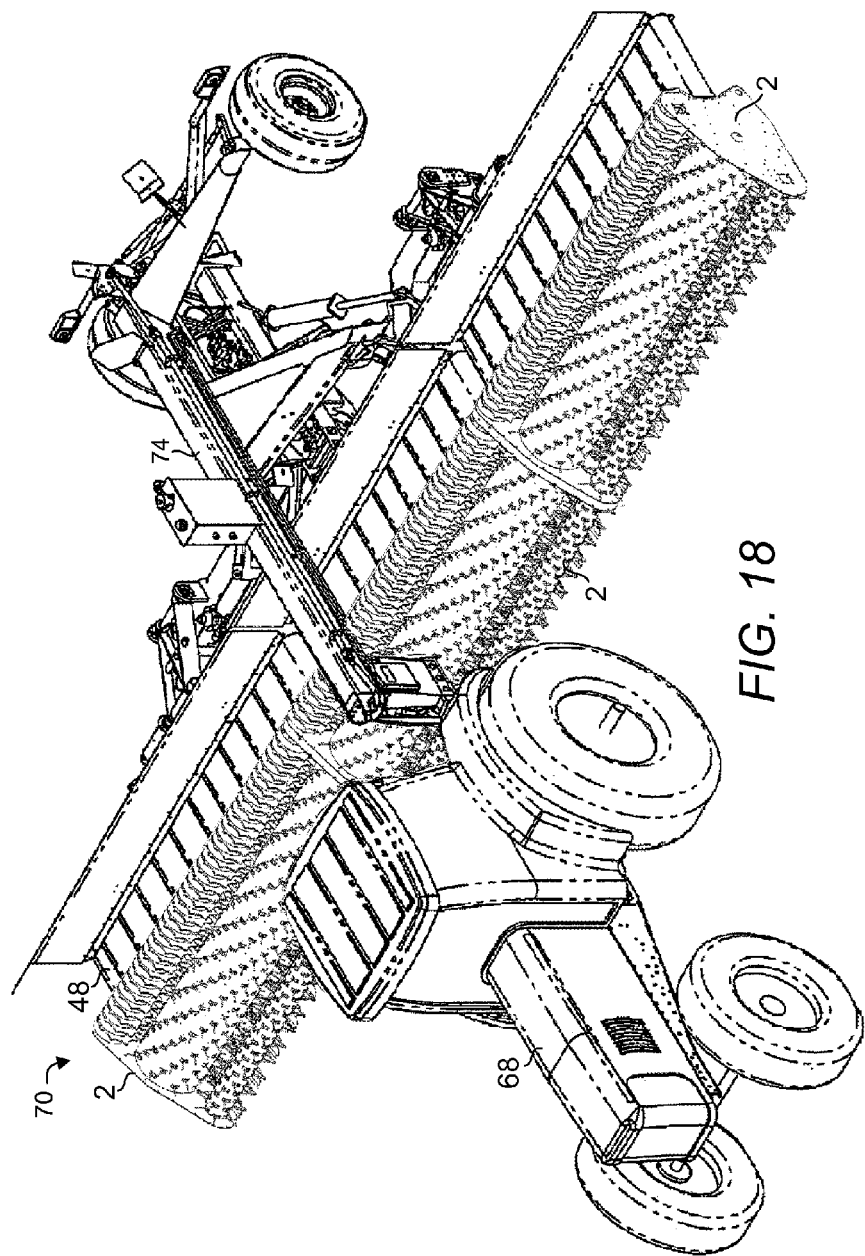
FIG. 18 is a top front perspective view of a plurality of pickup heads adapted to a framework configured to be towed using a tractor.

FIGS. 16-18 depict various equipment to which a present pickup head may be used. FIG. 16 is a side view of a pickup head 2 functionally attached to a tractor 68 configured to push the pickup head. FIG. 17 is a side view of a pickup head 2 functionally attached to a framework 74 configured to be towed using a tractor. FIG. 18 is a top front perspective view of a plurality of pickup heads 2 adapted to a framework 74 configured to be towed using a tractor. The present pickup head 2 may be incorporated in a windrow merger 70 as taught in U.S. Pat. No. 8,166,739 to Dow et al. (hereinafter Dow), shown and described as apparatus 100, the description of which in relation to the windrow merger is herein incorporated by reference. A present pickup head 2 may be used in place of each pickup head (parts 124, 126 and 128) of Dow.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

I claim:

1. A pickup head (2) having a width, a materials lifting end and a materials lofting end, said pickup head (2) comprising:
 (a) a lifting roller (6) comprising a sprocket (86), two ends along a first axis of rotation of said lifting roller (6), said sprocket (86) of said lifting roller (6) is attached to one of said two ends of said lifting roller (6), wherein said lifting roller (6) is disposed on the materials lifting end;
 (b) a transfer roller (8) comprising a sprocket (80), two ends along a second axis of rotation of said transfer roller (8), said sprocket (80) of said transfer roller (8) is attached to one of said two ends of said transfer roller (8), wherein said transfer roller (8) is disposed at an elevation higher than said lifting roller (6) between said materials lifting end and said materials lofting end;
 (c) a lofting roller (10) comprising a tube having a width and two opposingly disposed ends along a third axis of rotation of said lofting roller (10), an outer surface and a plurality of lofting effectors (56) disposed across said width of said tube of said lofting roller (10), said plurality of lofting effectors (56) protruding from said outer surface of said tube of said lofting roller (10) about said third axis of rotation of said lofting roller (10), a sprocket (82) attached to one of said two opposingly disposed ends of said lofting roller (10) and a plurality of strippers interspersed between said plurality of lofting effectors (56), said plurality of strippers are configured such that exposure of said plurality of lofting effectors (56) about said third axis of rotation of said lofting roller (10) is configured to be angularly altered with respect to said third axis of rotation of said lofting roller (10), wherein said lofting roller (10) is disposed at an elevation higher than said transfer roller (8) at said materials lofting end, wherein said sprocket of said lifting roller (6), said sprocket of said transfer roller (8) and said sprocket of said lofting roller (10) are configured to be rotatably coupled with a roller chain (86), said lifting roller (6) is adapted to rotate about said first axis of rotation in a first direction, said transfer roller (8) is adapted to rotate about said second axis of rotation in a second direction that is identical to said first direction, said lofting roller (10) is adapted to rotate about said third axis of rotation in a third direction that is identical to said first direction, said lifting roller (6) is configured to lift materials disposed upstream of the materials lifting end of said pickup head (2) while said pickup head (2) advances in the direction from the materials lifting end to the materials lofting end, said transfer roller (8) is configured to receive materials lifted with said lifting roller (6) and conveying the materials to said lofting roller (10), subsequently lofting the materials downstream from the materials lofting end of said pickup head (2) and said exposure is configured to diminish in the direction of movement of the materials, causing the materials to be separated from said lofting roller (10) downstream of said lofting roller (10).

2. The pickup head of claim 1, further comprising a float control mechanism adapted to adjust the pressure exerted by at least a portion of the weight of said pickup head (2) on a ground upon which said pickup head (2) is disposed.

3. The pickup head of claim 2, wherein said float control mechanism is an air bag (22) having a first end and a second end, wherein said first end is adapted to urge against said pickup head (2) and said second end is adapted to urge against a frame to which said pickup head (2) is mounted, whereby if said air bag (22) is increasingly inflated, the pressure exerted by at least a portion of the weight of said pickup head (2) on a ground is decreased and if said air bag (22) is increasingly deflated, the pressure exerted by at least a portion of the weight of said pickup head (2) on the ground is increased.

4. The pickup head of claim 1, further comprising a ground gauging device (24).

5. The pickup head of claim 4, wherein said ground gauging device (24) comprises a plurality of skid shoes (24) distributed along the width of said pickup head (2).

\* \* \* \* \*